US010102155B2

(12) United States Patent
Li et al.

(10) Patent No.: US 10,102,155 B2
(45) Date of Patent: Oct. 16, 2018

(54) METHOD AND DEVICE OF INFORMATION PROTECTION FOR MICRO CONTROL UNIT CHIP

(71) Applicant: GIGADEVICE SEMICONDUCTOR (BEIJING) INC., Beijing (CN)

(72) Inventors: Baokui Li, Beijing (CN); Jinghua Wang, Beijing (CN); Nanfei Wang, Beijing (CN)

(73) Assignee: GIGADEVICE SEMICONDUCTOR (BEIJING) INC., Beijing (CN)

( * ) Notice: Subject to any disclaimer, the term of this patent is extended or adjusted under 35 U.S.C. 154(b) by 51 days.

(21) Appl. No.: 15/505,926

(22) PCT Filed: Jan. 26, 2015

(86) PCT No.: PCT/CN2015/071556
§ 371 (c)(1),
(2) Date: Feb. 23, 2017

(87) PCT Pub. No.: WO2016/106911
PCT Pub. Date: Jul. 7, 2016

(65) Prior Publication Data
US 2018/0217945 A1 Aug. 2, 2018

(30) Foreign Application Priority Data
Dec. 30, 2014 (CN) .......................... 2014 1 0851200

(51) Int. Cl.
*G06F 12/14* (2006.01)
*G06F 21/79* (2013.01)
*G06F 21/85* (2013.01)
(52) U.S. Cl.
CPC .......... *G06F 12/1425* (2013.01); *G06F 12/14* (2013.01); *G06F 12/1441* (2013.01);
(Continued)

(58) Field of Classification Search
CPC .. G06F 12/1425; G06F 12/1458; G06F 21/79; G06F 21/85; G06F 2221/2141;
(Continued)

(56) References Cited

U.S. PATENT DOCUMENTS 5,293,424 A * 3/1994 Holtey ................. G06Q 20/341
235/380
8,190,919 B2 * 5/2012 Natarajan ........... G06F 12/1408
713/193

(Continued)

FOREIGN PATENT DOCUMENTS

CN 1196524 A 10/1998
CN 1595517 A 3/2005
(Continued)

*Primary Examiner* — Reginald G Bragdon
*Assistant Examiner* — Aaron D Ho
(74) *Attorney, Agent, or Firm* — Gokalp Bayramoglu

(57) ABSTRACT

The disclosure discloses a method and a device of information protection for a micro control unit (MCU) chip, the MCU chip comprises an instruction bus, a data bus, a flash controller and a user area of a flash memory; the flash controller is used to divide the user area into a first sub-area and a second sub-area; the method comprising: when the instruction bus accesses the user area, determining, whether the instruction bus accesses the first sub-area; if yes, entering the first sub-area working state; in the first sub-area working state, if the instruction bus accesses the second sub-area, entering the transition state; determining whether the time at transition state reaches a preset waiting time; if yes, entering the second sub-area working state; the disclosure is used to protect program from being stolen by users and prevent the cooperative companies stealing program from each other.

18 Claims, 6 Drawing Sheets

(52) U.S. Cl.
CPC .............. *G06F 21/79* (2013.01); *G06F 21/85* (2013.01); *G06F 2221/2141* (2013.01)

(58) Field of Classification Search
CPC ........ G06F 3/0637; G06F 21/60; G06F 21/62; G06F 13/16; G06F 13/1605; G06F 13/1684; G06F 13/18; G06F 13/20; G06F 13/36; G06F 13/42
USPC .......................... 711/103; 710/107–125, 312
See application file for complete search history.

(56) References Cited

U.S. PATENT DOCUMENTS

| | | | | |
|---|---|---|---|---|
| 2004/0088513 | A1* | 5/2004 | Biessener | G06F 21/85 711/173 |
| 2006/0242065 | A1* | 10/2006 | Jogand-Coulomb | G06F 21/10 705/50 |
| 2007/0136576 | A1 | 6/2007 | Chambers et al. | |
| 2008/0301389 | A1* | 12/2008 | Kim | G06F 9/468 711/163 |
| 2012/0144104 | A1* | 6/2012 | Gibney | G06F 13/1626 711/105 |
| 2013/0304979 | A1* | 11/2013 | Zimmer | G06F 13/14 711/103 |

FOREIGN PATENT DOCUMENTS

| | | | |
|---|---|---|---|
| CN | 1604791 | A | 4/2005 |
| CN | 101315608 | A | 12/2008 |
| CN | 101566972 | A | 10/2009 |
| CN | 103229157 | A | 7/2013 |

\* cited by examiner

METHOD AND DEVICE OF INFORMATION PROTECTION FOR MICRO CONTROL UNIT CHIP

CROSS-REFERENCE TO RELATED APPLICATIONS

This application is a national phase entry of International Application No. PCT/CN2015/071556, filed Jan. 26, 2015, which is based on and claims priority to Chinese Patent Application No. 201410851200.8, filed on Dec. 30, 2014, entitled "METHOD AND DEVICE OF INFORMATION PROTECTION FOR MICRO CONTROL UNIT CHIP", the entire contents of all of which are incorporated herein by reference.

TECHNICAL FIELD

The present disclosure relates to the field of electronic circuit and, more particularly, to an information protection method for an MCU chip and an information protection device for an MCU chip.

BACKGROUND

With the improvement of integrated circuit (IC), the application of an MCU chip becomes more widely used from toys to construction machinery. An MCU chip usually comprises a central processing unit (CPU), a flash, a static random access memory (SRAM) and a variety of peripherals. When the MCU chip is power down, flash content is not lost, while SRAM content is. A flash memory is usually composed of two distinct areas: one is a user area, used to store user's program, the other is an information area, used to store configuration information of the MCU chip. SRAM is usually used as an on-chip memory.

For an MCU application solution provider, a manufacturer who develops program and PCB (printed circuit board) based on the MCU chip, the program will be recorded on the user area of a flash memory. The core value of the application solution provider is the program. Thus, the program should be protected from being stolen by others. The information protection method of an MCU chip is to protect the program stored in the user area of a flash memory from being stolen by others. The current information protection method for an MCU chip is only available to protect the program in the user area as a whole, but not able to protect a program developed by two or more cooperative companies. Because the current method can only be used to protect the program in the user area from being stolen by users, not be used to prevent the cooperative companies stealing the program from each other.

Therefore, an urgent technical problem to be solved for the technicians in this field is: providing an information protection method for an MCU chip to protect the program from being stolen by users and prevent the companies who developed the program together stealing program from each other.

SUMMARY

The present disclosure is to provide an information protection method for an MCU chip to protect the program from being stolen by users and prevent the companies who developed the program together stealing program from each other.

Accordingly, the present disclosure also provides an information protection device for an MCU chip, to ensure the implementation and application of the method.

In view of the above problems, the present disclosure discloses an information protection method for an MCU chip, the MCU chip comprises: an instruction bus, a data bus, a flash controller and a user area of a flash memory; the flash controller is used to divide the user area into a first sub-area and a second sub-area; the method comprising:

when the instruction bus accesses the user area, determining whether the instruction bus accesses the first sub-area;

if the instruction bus accesses the first sub-area, entering the first sub-area working state; in the first sub-area working state, allowing the instruction bus to access the user area; allowing the data bus to access the first sub-area but prohibiting the data bus from accessing the second sub-area;

when the flash controller is in the first sub-area working state, if the instruction bus accesses the second sub-area, entering a transition state; in the transition state, temporarily prohibiting the instruction bus from accessing the user area, allowing the data bus to access the first sub-area, but prohibiting the data bus from accessing the second sub-area;

determining whether the time in the transition state reaches a preset waiting time;

if the time in the transition state reaches the preset waiting time, entering the second sub-area working state, in the second sub-area working state, allowing the instruction bus to access the user area, prohibiting the data bus from accessing the first sub-area, but allowing the data bus to access the second sub-area.

Preferably, the method further comprises:

after resetting the MCU chip, entering an initial state; in the initial state, allowing the instruction bus to access the user area, prohibiting the data bus from accessing the first sub-area or the second sub-area.

Preferably, the MCU chip comprises a central processing unit (CPU) with a Harvard architecture; the preset waiting time is correlated with features of the CPU; if the CPU is ARM Cortex-M3, the preset waiting time is 20 CPU clock cycles.

Preferably, the MCU chip comprises an information area of a flash memory, the information area comprises option bytes; the method further comprising:

determining the reading protection state of the user area according to the option bytes;

if in a zero-level reading protection state, allowing reading, writing and erasing on the user area;

if in a first-level reading protection state, allowing reading, writing and erasing on the first sub-area, only when the MCU chip boots from the user area, allowing reading, writing and erasing on the second sub-area;

if in a second-level reading protection state, allowing reading, writing and erasing on the first sub-area and second sub-area only when the MCU chip boots from the user area.

Preferably:

in the zero-level reading protection state, allowing the option byte to be modified;

in the first-level reading protection state, allowing the option bytes to be modified, if the reading protection state is modified from the first-level to the zero-level by modifying the option bytes, all information in the user area is erased;

in the second-level reading protection state, prohibiting the option bytes from being modified.

Preferably, an on-chip private peripheral can be implemented on the MCU chip, a first peripheral is a private peripheral which only works normally when a first sub-area enabling signal is high, a second peripheral is a private peripheral which only works normally when a second sub-area enabling signal is high; the method further comprising:

in the first sub-area working state, or, in the first sub-area transition state, the first sub-area enabling signal is high, in other states, it is low; in the second sub-area working state, or, in the second sub-area transition state, the second sub-area enabling signal is high, in other states, it is low.

Preferably, the private peripheral comprises a static random access memory (SRAM).

Preferably, the first sub-area is located in the first half of an address space in the user area, the second sub-area is located in the second half of the address space in the user area.

The present disclosure further discloses an information protection device for an MCU chip, the MCU chip comprises an instruction bus, a data bus, a flash controller and a user area; the flash controller is used to divide the user area into a first sub-area and a second sub-area, the device comprising:

a first determining module, configured to, when the instruction bus accesses the user area, determine whether the instruction bus accesses the first sub-area; if yes, invoke a first entering module;

a first entering module, configured to, enter the first sub-area working state; in the first sub-area working state, allow the instruction bus to access the user area; allow the data bus to access the first sub-area but prohibiting the data bus from accessing the second sub-area;

a second entering module, configured to, when the flash controller is in the first sub-area working state, if the instruction bus accesses the second sub-area, enter a transition state; in the transition state, temporarily prohibit the instruction bus from accessing the user area, allow the data bus to access the first sub-area, but prohibit the data bus from accessing the second sub-area;

a second determining module, configured to, determine whether the time in the transition state reaches a preset waiting time; if yes, invoke a third entering module;

the third entering module, configured to, enter the second sub-area working state, in the second sub-area working state, allow the instruction bus to access the user area, prohibit the data bus from accessing the first sub-area, but allow the data bus to access the second sub-area.

Preferably, the device further comprises:

a fourth entering module, configured to, after resetting the MCU chip, enter an initial state; in the initial state, allow the instruction bus to access the user area, prohibit the data bus from accessing the first sub-area or the second sub-area.

Preferably, the MCU chip comprises an information area of a flash memory, the information area comprises option bytes; the device further comprises:

a determining module, configured to, determine the reading protection state of the user area according to the option bytes;

a first protection module, configured to, if in a zero-level reading protection state, allow reading, writing and erasing on the user area;

a second protection module, configured to, if in a first-level reading protection state, allow reading, writing and erasing on the first sub-area, only when the MCU chip boots from the user area, allow reading, writing and erasing on the second sub-area;

a third protection module, configured to, if in a second-level reading protection state, only when the MCU chip boots from the user area, allow reading, writing and erasing on the first sub-area and the second sub-area.

Preferably, in the zero-level reading protection state, the option bytes are allowed to be modified;

in the first-level reading protection state, the option bytes are allowed to be modified, if the reading protection state is modified from the first-level to the zero-level by modifying the option bytes, all information in the user area is erased;

in the second-level reading protection state, the option bytes are prohibited from being modified.

Preferably, an on-chip private peripheral is implemented on the MCU chip, a first peripheral is a private peripheral which only works normally when a first sub-area enabling signal is high, a second peripheral is a private peripheral which only works normally when a second sub-area enabling signal is high; the device further comprising:

a first output module, configured to, in the first sub-area working state, or, in the first sub-area transition state, the first sub-area enabling signal is high; in other states, it is low;

a second output module, configured to, in the second sub-area working state, or, in the second sub-area transition state, the second sub-area enabling signal is high, in other states, it is low.

The embodiment of the present application also discloses a computer readable recording medium on which a program for carrying out the method according to claim 1 is recorded.

Compared with the conventional technology, the present disclosure has the following advantages:

in the present disclosure, the flash controller in the MCU chip divides the user area into the first sub-area and the second sub-area, when the instruction bus accesses the user area, the user area can be normally accessed by the instruction bus, but data bus to access sub-area is restricted. For instance, when the instruction bus accesses the first sub-area, the data bus is only allowed to access the first sub-area, not allowed to access the second sub-area. If the instruction bus turns to access the second sub-area from the first sub-area, the instruction bus is temporarily prohibited from accessing user area, and when the time in the transition state reaches a preset waiting time, the instruction bus is allowed to access user area again. By now, the data bus is prohibited from accessing the first sub-area, but allowed to access the second sub-area. When the instruction bus accesses the user area, in the present disclosure, the data bus is only allowed to access the sub-area accessed by the instruction bus to protect the program in the user area from being stolen by cooperative company.

In the present disclosure, a reading protection level is set for the MCU chip. The reading protection level is determined according to the option bytes in the information area to restrict the operations on the user area. During the cooperative development process of the MCU chip program, in order to prevent cooperative companies stealing program from each other, when one company is about to accomplish the development, the reading protection level of the user area may be increased to restrict program recorded on the user area to be read by other company, therefore, to prevent the companies who developed the program together stealing program from each other. In addition, if someone attempts to steal the authority of accessing programs in the user area by lowering the reading protection level, all the programs in the user area are erased, which may further protect the company's development efforts.

In the embodiment of the present disclosure, sub-areas may be allocated to different cooperative companies; a peripheral may be designed as a private peripheral of a sub-area; each sub-area has a corresponding sub-area enabling signal, the sub-area enabling signal may control the corresponding private peripheral. For instance, part or all of the functions of a private peripheral may be enabled or disenabled according to corresponding sub-area enabling signal, which may prevent the intermediate results processed by program from being obtained by other cooperative companies.

DETAILED DESCRIPTION OF THE EMBODIMENTS

Figure 1:
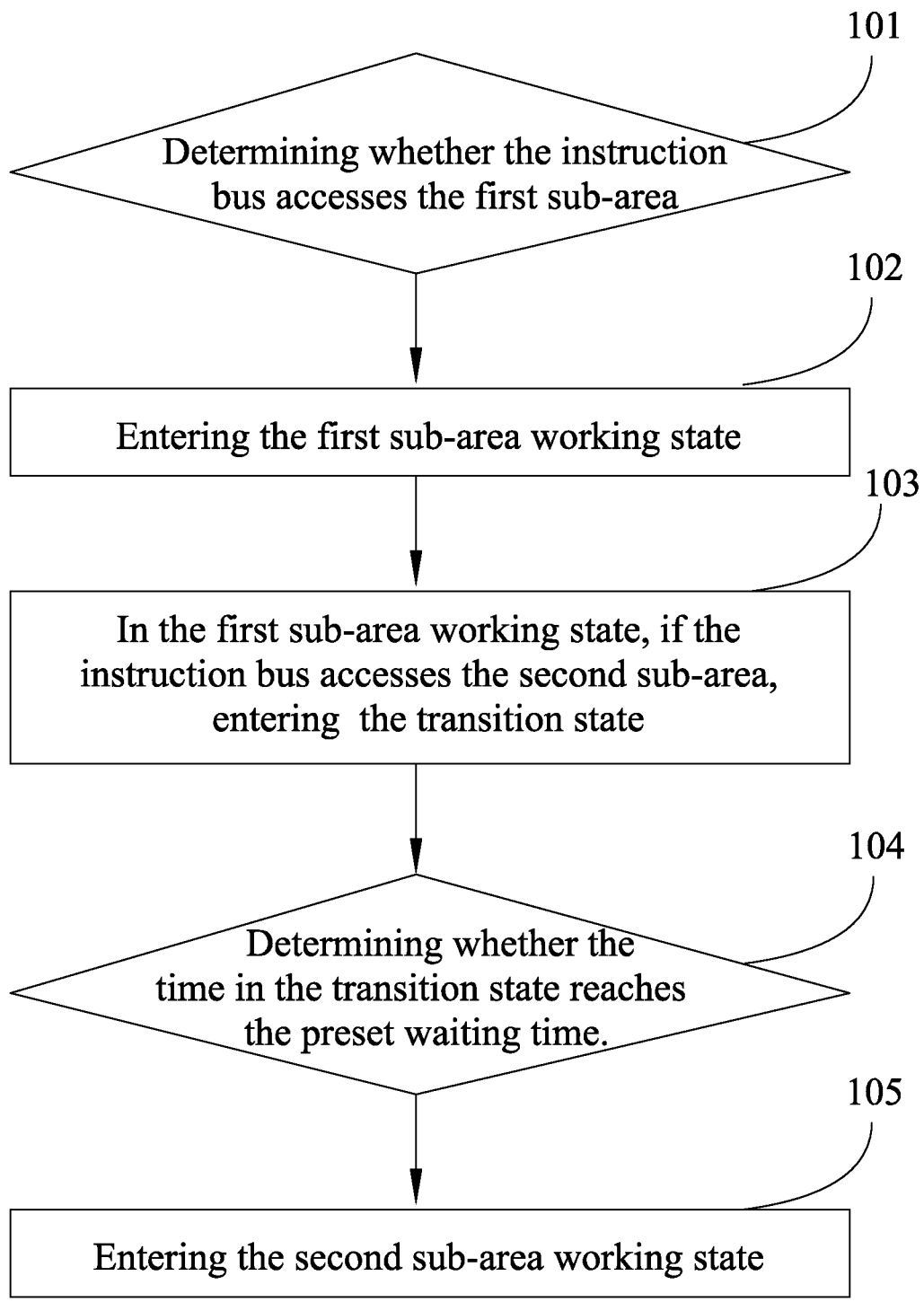
FIG. 1 illustrates a flow diagram of an information protection method for an MCU chip according to an embodiment of the present disclosure.

In order to understand the objects, features and advantages of the present disclosure described above more apparently, specific description in conjunction with the accompanying drawings are provided hereinafter.

An embodiment of the present disclosure of an information protection method for MCU is described below.

The reading protection level of the flash controller is controlled by a number of control bytes in an information area of the flash memory. The reading protection level of the flash controller is divided into three levels, characterizations of each level are as follows:

zero-level reading protection: a user area of the flash memory is completely accessible, allowed to perform reading, writing and erasing on the user area; the information area is completely accessible as well.

first-level reading protection: the user area can be accessed normally when the MCU chip boots from the user area; other booting methods (including booting from other areas and joint test action group (JTAG) and other debugging methods) cannot access user area, reading, writing, erasing or other operations are not allowed to be performed. At this level, information area is allowed to be accessed. But if the reading protection level of flash controller is changed to zero level by modifying control bytes, all the information in user area is erased.

second-level reading protection: the user area can be accessed normally when the MCU chip boots from the user area; other booting methods (including booting from other areas and joint test action group (JTAG) and other debugging methods) are all disenabled. At this level, the information area is read-only, cannot be written or erased.

In the above-mentioned information protection method of the MCU chip, the user area is protected as a whole. If the program of MCU chip is developed by one company, this method is able to meet the demand. But the MCU chip is becoming increasingly complex, so as the program in the MCU chip. The program is required to be developed by two or more companies. The current information protection method is failing to satisfy the requirements. The current method is only able to protect the user area from being stolen by users, but not able to prevent cooperative companies stealing from each other. Based on the above-mentioned requirements, a new information protection method for an MCU chip is further provided by the present disclosure.

The information protection method for an MCU chip proposed by the embodiment of the present disclosure is able to meet the protection needs for program of MCU chips developed by two cooperative companies. In the embodiment of the present disclosure, the user area of the flash memory is divided into two sub-areas, and programs of the cooperative companies can be written separately in their own sub-areas. The embodiment of the present disclosure is able to ensure that the programs developed by the two companies not only mutually invoke each other normally, but also prevent them from stealing the other's program in the other sub-area. Meanwhile, it is also able to prevent the program stored in the user area from being stolen by the users. Besides, if SRAM or other peripherals are shared by the two cooperative companies, program might be stolen by the other company through the shared resources. In the embodiment of the present application, it may also allocate a specific SRAM or a peripheral to one company as a private device to broaden the application range of the embodiment of the present disclosure.

Figure 2:
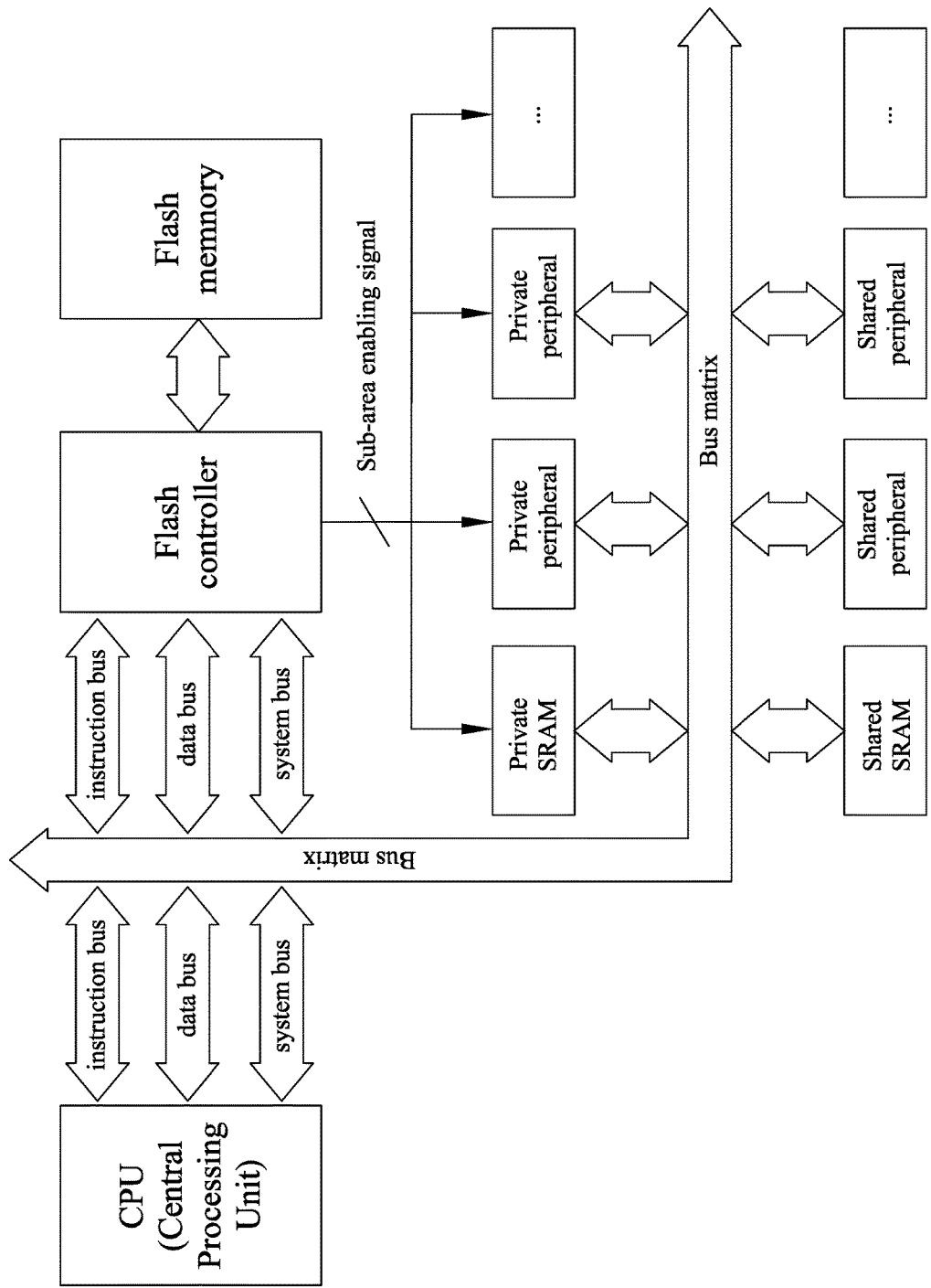
FIG. 2 depicts a system schematic of an MCU chip based on a CPU with a Harvard architecture according to the present disclosure.

FIG. 1 illustrates a flow diagram of an information protection method for an MCU chip according to an embodiment of the present disclosure, the MCU chip comprises an instruction bus, a data bus, a flash controller and a user area of the flash memory; the flash controller is used to divide the user area into a first sub-area and a second sub-area;

FIG. 2 depicts a system schematic of an MCU chip based on a CPU with a Harvard architecture for the present disclosure, the MCU chip usually comprises a CPU, a bus, a flash, a flash controller, SRAM, a variety of master peripherals and slave peripherals and so on. The bus may comprise an instruction bus, a data bus and a system bus. In the specific implementation, CPU is connected with bus interconnected matrix through the instruction bus, data bus and system bus. The instruction bus is responsible for reading the instructions; the data bus is responsible for data access; the system bus is responsible for accessing peripherals.

The flash controller of the MCU chip is a bridge for connecting the bus and the flash. The flash controller is connected with bus interconnected matrix also through the three buses. The instruction bus is responsible for accepting instruction access from the CPU, the data bus is responsible for accepting CPU data access. The configuration registers of the flash controller are accessed through the system bus. SRAM and all kinds of peripherals are both connected with bus interconnected matrix. In the embodiment of present disclosure, if the MCU chip is cooperatively developed by two companies, two sub-areas can be allocated to each company. A peripheral can be designed as the private peripheral for one sub-area. Each sub-area has the corresponding sub-area enabling signal. The private peripheral is controlled by the sub-area enabling signal output by the flash controller.

In the specific implementation, "access" comprises all kinds of operations. The operations for bus of MCU chip comprising reading and writing which means that the bus access comprises operations of reading and writing. The flash comprises reading, writing and erasing operations, meaning the access to flash comprises operations including reading, writing and erasing.

The above-mentioned method specifically comprises the following steps:

step 101, when the instruction bus accesses the user area, determining whether the instruction bus accesses the first sub-area; if yes, step 102 is performed;

step 102, entering the first sub-area working state; in the first sub-area working state, allowing the instruction bus to access the user area; allowing the data bus to access the first sub-area but prohibiting the data bus from accessing the second sub-area;

step 103, in the first sub-area working state, if the instruction bus accesses the second sub-area, entering a transition state; in the transition state, temporarily prohibiting the instruction bus from accessing the user area, allowing the data bus to access the first sub-area, but prohibiting the data bus from accessing the second sub-area;

step 104, determining whether the time in the transition state reaches a preset waiting time; if yes, step 105 is performed;

step 105, entering the second sub-area working state, in the second sub-area working state, allowing the instruction bus to access the user area, prohibiting the data bus from accessing the first sub-area, but allowing the data bus to access the second sub-area.

The application of the present embodiment at least has the following two advantages: firstly, the content in flash is protected from being stolen by users; secondly, the cooperative companies which develop the program together are prevented stealing the program from each other.

There is definitely a master company which develops the main program, and the other is to develop library function. The master company which develops the main program is called the master company while the others which develop library function are called the slave companies hereinafter. Each company can be allocated a sub-area. The master sub-area is located in the beginning of the address space in the user area, the slave sub-areas are located in the following address space in the user area. When the MCU chip boots, the program developed by the master company is performed. The information protection method for an MCU chip in the present embodiment can be described in three parts: the first part is sub-area protection method; the second part is definition and application method of reading protection; the third part is the implementation method of private peripheral. The first part and the second part are implemented in the flash controller while the third part is implemented in the private peripheral on the basis of the sub-area enabling signal output by the flash controller.

The First Part: Sub-Area Protection Method.

Figure 3:
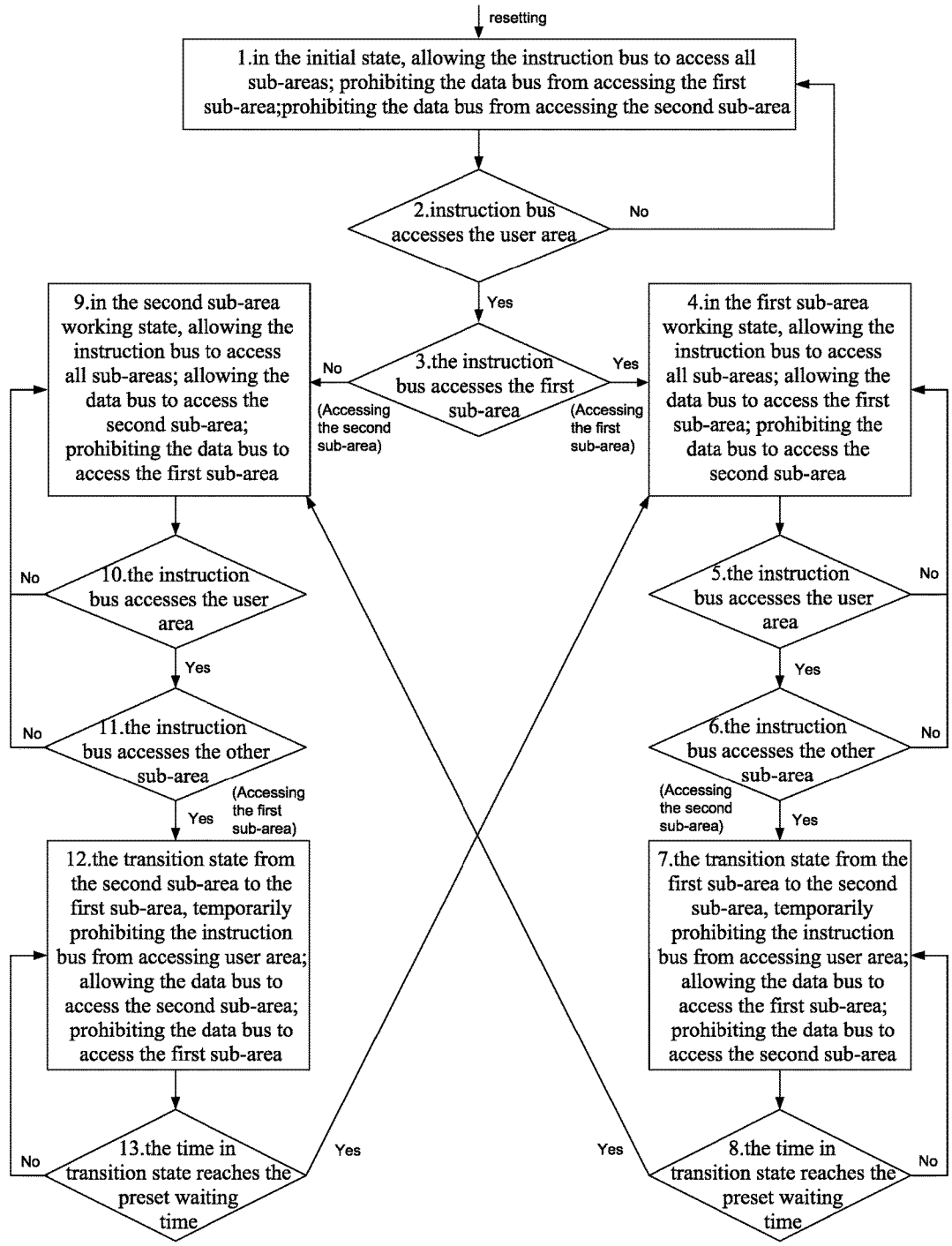
FIG. 3 shows a work flow schematic of a flash controller in an MCU chip according to the present disclosure.

When the MCU chip boots from the user area, the user area may be normally accessed by the CPU instruction bus and restrictedly accessed by the CPU data bus, but cannot be accessed by other master peripheral. According to the work flow schematic of a flash controller in an MCU chip for the present disclosure depicted by FIG. 3, the specific steps are as follows:

1. After resetting the MCU chip, the flash controller staying in an initial state; in the initial state, allowing the instruction bus to access both sub-areas, prohibiting the data bus from accessing either of the sub-area.

2. determining whether the instruction bus accesses the user area; if yes, performing step 3, if not, returning to step 1.

3. determining whether the instruction bus accesses the first sub-area; if yes, step 4 is performed, if not, performing step 9.

4. entering the first sub-area working state, in the first sub-area working state, the instruction bus is allowed to access both sub-areas, the data bus is allowed to access the first sub-area but not allowed to access the second sub-area (if the data bus is trying to access the second sub-area, returning an error response).

5. determining whether the instruction bus accesses the user area; if not, returning to step 4, which means, if the instruction bus doesn't access the user area, staying in the current working state (the first sub-area working state); if yes, performing step 6.

6. determining whether the instruction bus accesses the other sub-area (the second sub-area); if the instruction bus accesses the current working sub-area (the first sub-area), staying in the current working state, which means, returning to step 4, if the instruction bus accesses the other sub-area (the second sub-area), performing step 7.

7. entering the first sub-area transition state, in the first sub-area transition state, temporarily prohibiting the instruction bus from accessing the user area, allowing the data bus to access the first sub-area, but not allowing the data bus to access the second sub-area (if the data bus is trying to access the second sub-area, returning an error response);

8. determining whether the time in the first sub-area transition state reaches the preset waiting time; if yes, performing step 9; if not, returning to step 7.

9. entering the second sub-area working state, in the second sub-area working state, the instruction bus is allowed to access both sub-areas, the data bus is allowed to access the second sub-area but not allowed to access the first sub-area (if the data bus is trying to access the first sub-area, returning an error response).

10. determining whether the instruction bus accesses the user area; if not, returning to step 9, which means if instruction bus doesn't access the user area, staying in the current state (the second sub-area working state); if yes, performing step 11.

11. determining whether the instruction bus accesses the other sub-area (the first sub-area); if the instruction bus accesses the current working sub-area (the second sub-area), staying in the current state, which means returning to step 9, if the instruction bus accesses the other sub-area (the first sub-area), performing step 12.

12. entering the second sub-area transition state; in the second sub-area transition state, temporarily prohibiting the instruction bus from accessing the user area, allowing the data bus to access the second sub-area, but not allowing the data bus to access the first sub-area (if the data bus is trying to access the first sub-area, returning an error response).

13. determining whether the time in the second sub-area transition state reaches the preset waiting time; if yes, performing step 4; if not, returning to step 12.

In a preferred embodiment of the present disclosure, the preset waiting time in the transition state is correlated with the CPU features of the MCU chip. The CPU with a Harvard architecture reads the instructions through instruction bus, accesses data through data bus. The instruction bus and data bus work in parallel. The CPU obtains the instruction ought to perform through instruction bus, then determines whether to access data, and data of which address is ought to be accessed through instruction parsing, then accomplishes corresponding data accessing through data bus.

The procedure from reading instructions by instruction bus to accomplishing corresponding data accessing by data takes through a number of cycles. The transition state is to make sure that the data accessing for current working sub-area is accomplished, meanwhile prevent the instruction bus from accessing to other sub-areas, which means, extend the instruction bus access and prevent it from being accomplished. When the data accessing for current working sub-area is accomplished, a new working sub-area is jumped to. The waiting time needs to be long enough to ensure the data accessing of the current working sub-area is completely accomplished. Take ARM Cortex-M3 as an example, the waiting time can be set as 20 CPU clock cycles.

The Second Part: Definition and Application Method of Reading Protection Level.

Figure 5:
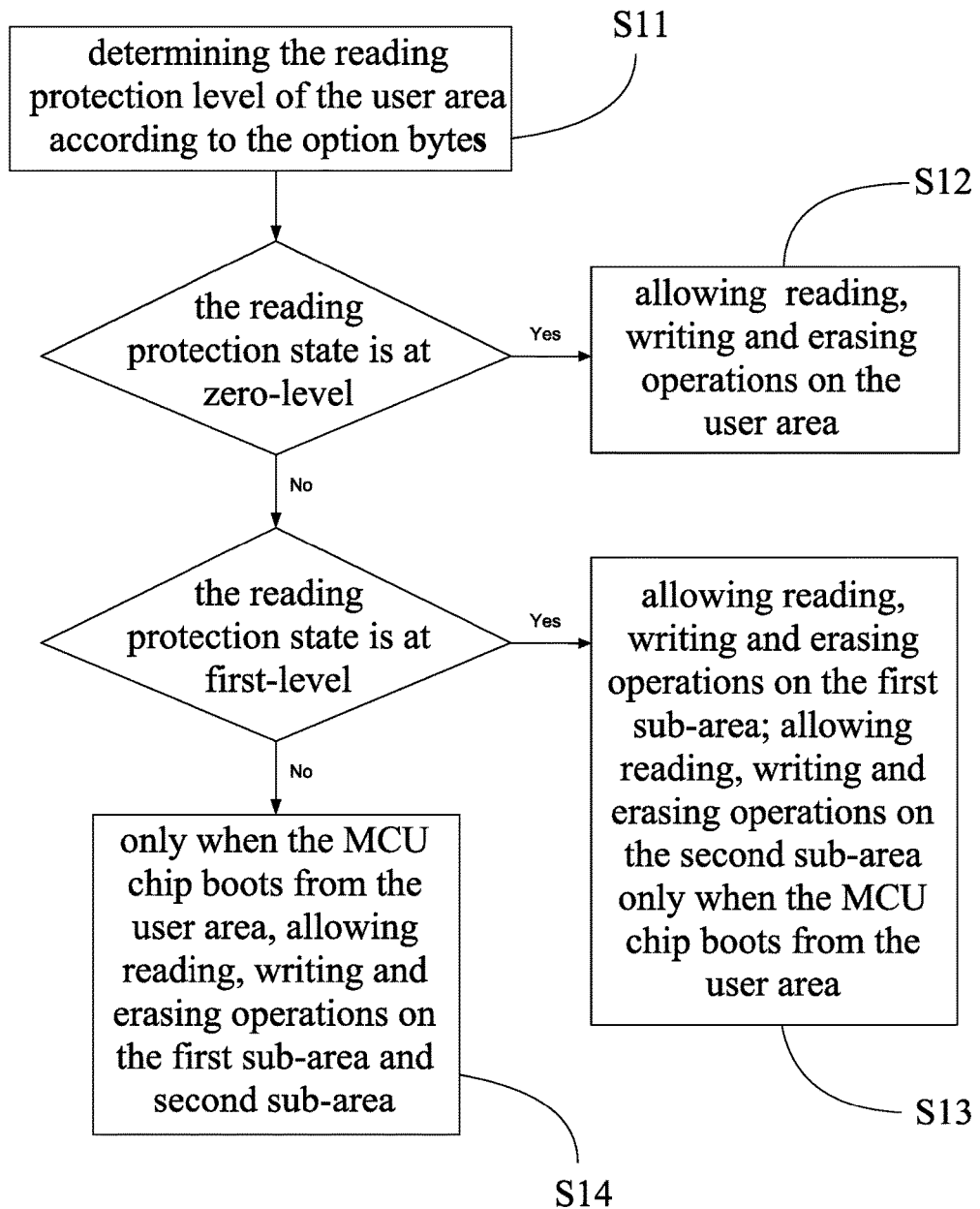
FIG. 5 shows a work flow schematic of the application method of the reading protection level.

In a preferred embodiment, as shown in FIG. 5, wherein, the MCU chip comprises an information area, the information area comprises option bytes; the method comprises the following steps:

step S11, determining the reading protection level of the user area according to the option bytes;

step S12, if the reading protection state is at zero-level, allowing to perform reading, writing and erasing operations on the user area;

step S13, if the reading protection state is at first-level, allowing to perform reading, writing and erasing operations on the first sub-area; allowing to perform reading, writing and erasing operations on the second sub-area only when the MCU chip boots from the user area.

step S14, if the reading protection state is at second-level, only when the MCU chip boots from the user area, allowing to perform reading, writing and erasing operations on the first sub-area and second sub-area.

In a preferred embodiment, in the zero-level reading protection state, allowing the option bytes to be modified;

in the first-level reading protection state, allowing the option bytes to be modified, if the reading protection state is modified from first level to zero level by modifying the option bytes, all information in the user area is erased (to protect the contents in the user area from being stolen by users, the zero-level reading protection state is turned to after the content in user area is erased completely);

in the second-level reading protection state, prohibiting the option bytes from being modified.

In specific implementation, reading protection level may be controlled by some bytes in the information area of the flash memory, the bytes are option bytes. The control method in this embodiment is optional, as long as the method is able to separate different reading protection level and easily to switch from one level to another. For example, controlling with one byte, when the byte is A5, the reading protection state is at zero level; when the byte is CC, the reading protection state is at second level; when the byte is other values besides A5 and CC, the reading protection state is at first level.

During the development of program for the MCU chip, the method of reading protection level can be as follows. Firstly, the manufactured MCU chips are sent to the second company, by then the reading protection state is at zero level, the user area of the flash memory is empty. The second company records their program in the second sub-area of the user area. The program can be debugged in the zero-level reading protection state by the second company. Before giving the chips to the first company, the second company modifies the reading protection state into first level. The first company records their program in the first sub-area of the user area. By then, the first sub-area of the user area stores the program developed by the first company, and the second sub-area of the user area stores the program developed by the second company, the reading protection state is at first level. The first company accomplishes the cooperative debugging in the first-level reading protection state. For formal production, before giving the chip to the user, the first company modifies the reading protection state into second level.

The Third Part: Implementation Method of Private Peripheral.

Figure 6:
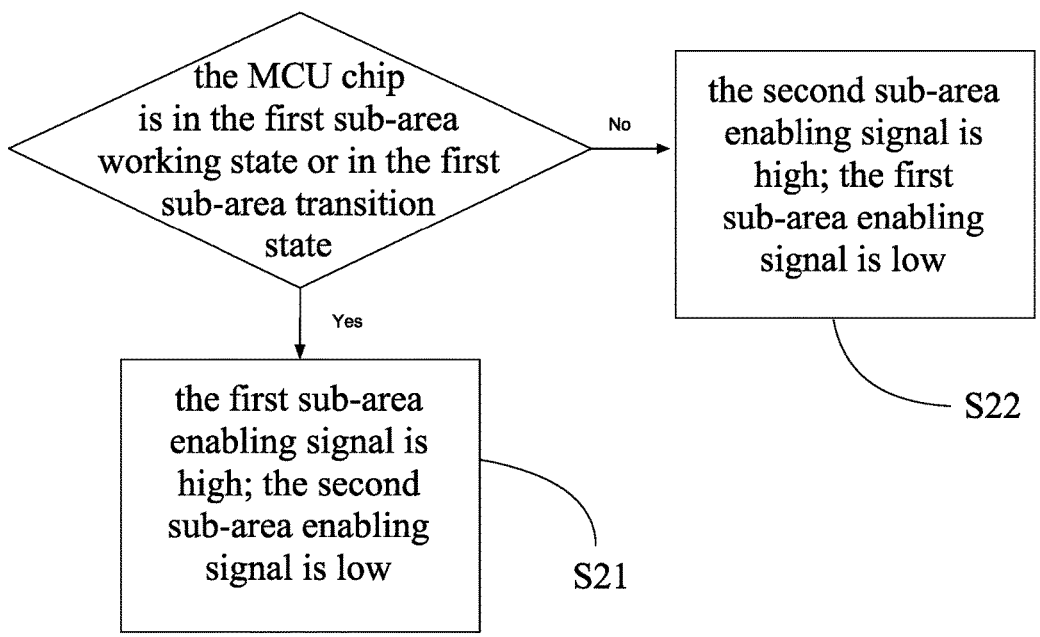
FIG. 6 shows a work flow schematic of the implementation method of private peripheral.

In a preferred embodiment of the present disclosure, as shown in FIG. 6, an on-chip private peripheral can be implemented on the MCU chip for specific requirement. The private peripheral which only works normally when the first sub-area enabling signal is high is the first peripheral, the private peripheral which only works normally when the second sub-area enabling signal is high is the second peripheral. The method comprises the following steps:

step S21, in the first sub-area working state, or, in the first sub-area transition state, the first sub-area enabling signal is high, in other states, it is low;

step S22, in the second sub-area working state, or, in the second sub-area transition state, the second sub-area enabling signal is high, in other states, it is low.

In the present embodiment, the private peripheral is the peripheral controlled by the sub-area enabling signal output by flash controller. Each sub-area may correspond to a 1-bit sub-area enabling signal. The sub-area enabling signal indicates that the corresponding sub-area is in working state. The sub-area enabling signal is high in the corresponding sub-area's sub-area working state and sub-area transition state, while it is low in the other states. The controlling method is to enable or disable parts or all of the functions of the corresponding peripheral according to the state of the sub-area enabling signal.

For instance, to ensure one SRAM is only allowed to be read by the program of the master company, the master sub-area enabling signal can be used as the reading enabling signal of the SRAM; to make sure the operation results register of one private peripheral is only allowed to be read by the program of a slave company, the sub-area enabling signal corresponding to the slave company can be used as the reading enabling signal for the operation results register; to make sure one private peripheral is only allowed to be configured by the program of the master company, the master sub-area enabling signal can be used as the configuration enabling signal for the peripheral register.

Apparently, private peripheral may not be implemented in practice. That is, all of the peripherals may be shared. The present embodiment is not restricted hereto.

It should be noted that, for the convenience of description, the embodiments of the present disclosure are all depicted as series of action combination. But one skilled in the art shall be aware that the embodiment is not restricted to the action sequence, because some of the steps may be performed in other sequences or simultaneously according to the embodiments. Besides, one skilled in the art shall also aware that the embodiments depicted in the detailed description part are all preferred embodiments, the related actions may not be necessary for the embodiments of the present disclosure.

Figure 4:
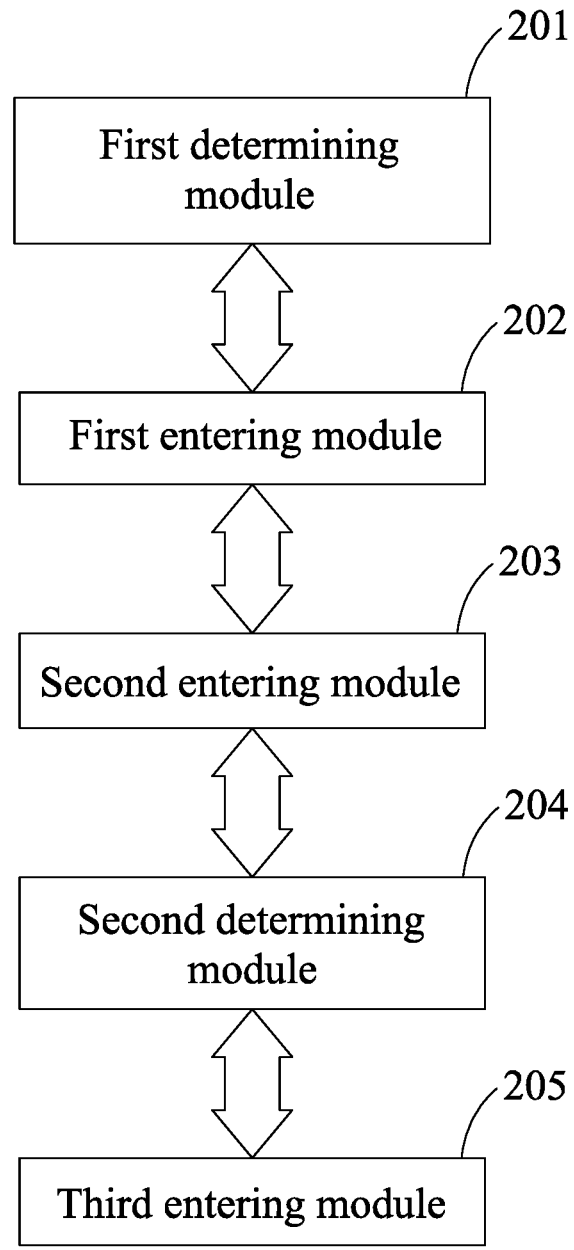
FIG. 4 shows a structure diagram of an information protection device for an MCU chip according to the present disclosure.

FIG. 4 shows a structure diagram of an information protection device for an MCU chip for the present disclosure, the MCU chip may comprise an instruction bus, a data bus, a flash controller and a user area. The flash controller is used to divide the user area into a first sub-area and a second sub-area, the device may comprise the specific modules:

a first determining module 201, configured to, when the instruction bus accesses the user area, determine whether the instruction bus accesses the first sub-area; if yes, invoke a first entering module 202;

the first entering module 202, configured to, enter a first sub-area working state; in the first sub-area working state, allow the instruction bus to access the user area, allow the data bus to access the first sub-area, but prohibit the data bus from accessing the second sub-area;

in a preferred embodiment, the first sub-area is located in the first half of the address space in the user area, while the second sub-area is located in the second half of the address space in the user area.

A second entering module 203, configured to, when the flash controller is in the first sub-area working state, the instruction bus accesses the second sub-area, enter a transition state; in the transition state, temporarily prohibit the instruction bus from accessing the user area, allow the data bus to access the first sub-area, but prohibit the data bus from accessing the second sub-area;

a second determining module 204, configured to, determine whether the time in the transition state reaches preset waiting time; if yes, invoke a third entering module 205;

the third entering module 205, configured to, enter a second sub-area working state, in the second sub-area working state, allow the instruction bus to access the user area, prohibit the data bus from accessing the first sub-area, but allow the data bus to access the second sub-area.

In a preferred embodiment, the MCU chip comprises a CPU, the CPU has a Harvard architecture; the preset waiting time is correlated with the CPU features; the CPU is ARM Cortex-M3, the preset waiting time is 20 CPU clock cycles.

In a preferred embodiment, the device further comprises the following module:

a fourth entering module, configured to, when the MCU chip resets, enter an enabling state; in the enabling state, allow the instruction bus to access the user area, prohibit the data bus from accessing the first sub-area or the second sub-area.

In a preferred embodiment, the MCU chip comprises an information area, the information area comprises option bytes; the device further comprises the following modules:

a determining module, configured to, determine a reading protection state of the user area according to the option bytes;

a first protection module, configured to, in a zero-level reading protection state, allow to perform reading, writing and erasing on the user area;

a second protection module, configured to, in a first-level reading protection state, allow to perform reading, writing and erasing on the first sub-area, only when the MCU chip boots from the user area, allow to perform reading, writing and erasing on the second sub-area;

a third protection module, configured to, in a second-level reading protection state, allow to perform reading, writing and erasing on the first sub-area and the second sub-area, only when the MCU chip boots from the user area.

In a preferred embodiment, in the zero-level reading protection state, allowing the option bytes to be modified;

in the first-level reading protection state, allowing the option bytes to be modified, if the reading protection state is modified from the first level to zero level by modifying the option bytes, all information in the user area is erased;

in the second-level reading protection state, prohibiting the option bytes from being modified.

In a preferred embodiment, the MCU chip may be designed with private peripherals according to specific requirements. A private peripheral which only works normally when the output is an effective first sub-area enabling signal is a first peripheral, a private peripheral which only works normally when the output is an effective second sub-area enabling signal is a second peripheral. The device further comprising:

a first output module, configured to, in the first sub-area working state, or, in the first sub-area transition state, output the first sub-area enabling signal;

a second output module, configured to, in the second sub-area working state, or, in the second sub-area transition state, output the second sub-area enabling signal.

In a preferred embodiment, the peripheral may comprise a static random access memory (SRAM).

For the embodiments of device, considering that the theories are similar with the mentioned embodiments, the description is relatively simple. The similar parts may be referred to the descriptions for embodiments of the method.

The embodiment of the present disclosure further provides a computer readable recording medium recorded with a program for executing the program of the above embodiments.

The computer readable recording medium comprises all kinds of mechanisms for information storing and transmitting. The mechanisms shall be in form of machine-readable (e.g., computer readable). For instance, the machine-readable medium includes read-only memory (ROM), random access memory (RAM), disk memory media, optical memory media, flash media; electrical, optical, acoustic or other forms of propagated signals (e.g., carrier signal, infrared signal, digital signal, etc.) etc.

The embodiments in the present disclosure are disclosed progressively, each embodiment mainly emphasizes the differences from other embodiments, while similar parts between different embodiments may be referred to each other.

One skilled in the art shall be aware that, the embodiments of the present disclosure may provide as mentioned, device or program for computers. Therefore, the embodiments of the present disclosure may be implemented only by hardware, only by software or by the form with combination of both software and hardware. In addition, the embodiment of the present disclosure may be adopted in the form of computer program. The computer program may be implemented on one or more computer-usable storage media which comprise computer-usable program codes (including but not limited to disk memory, CD-ROM, optical memory etc.).

The embodiments are described on the basis of the flow diagrams and/or block diagrams of the method, terminal device (system) and computer program products of the present disclosure. It should be understood that, each of the flow (or block) or the combinations of several flows (or blocks) for flow diagrams (or block diagrams), may be implemented by the computer instructions. The computer program instructions may be implemented to the processor of general-purpose computers, special-purpose computers, embedded processor or other programmable data processing terminal devices to generate a machine. The machine may generate a device which can realize specific functions by implementing one or more flows (or blocks) from the flow diagram (or block diagram) through implementing the processor instructions.

The computer program instructions may also be stored in computer readable memory. The computer readable memory may guide a computer or other programmable data processing terminal devices to work in a specific way, so that the instructions stored in the computer readable memory may generate products comprising instruction devices. The instruction devices may realize specific functions according to one or more flows (or blocks) in the flow diagram or (block diagram).

The computer program instructions may also be loaded onto computers or other programmable data processing terminal devices. A series of operation steps are implemented on the computer or other programmable data processing terminal devices to resulting in a computer-implemented process. Thus the instructions implemented on the computer or other programmable data processing terminal devices may provide steps to realize specific functions for one or more flows (or blocks) on the flow diagram (or block diagram).

Although preferred embodiments have been described in the present disclosure, one skilled in the art shall also be noted that, modifications and improvements may be obtained according to basic concept of creativity. Therefore, the appended claims are intended to be construed as embodying the preferred embodiments and all modifications and improvements that fall within the scope of the present disclosure.

Finally, it should be noted that, in the present disclosure, "the first", "the second" and terms like that are only used to separate the entities or actions from each other. The terms are not necessary and do not imply any relationship or sequence between the entities or actions. Besides, the term "comprising", "including" or any other variation that intended to encompass a non-exclusive inclusion of a series of elements comprises not only the elements mentioned but also other elements not listed in specific and other inherent elements. The elements may comprise procedures, methods, entities, items and terminal devices. In the absence of more restrictions, the elements restricted by sentences with "comprises a . . . " do not preclude the presence of other elements in the procedures, methods, items or terminal devices which comprise the mentioned elements.

The disclosure discloses an information protection method for an MCU chip and an information protection device for an MCU chip in detail. The disclosure applies specific embodiments to explain the theory and implementation method and describe the method and core ideas. Meanwhile, one skilled in the art may make modification or improvement on the basis of the present disclosure on the implementation methods or application scope. To sum up, the description above may not be taken as restriction to the disclosure.

What is claimed is:

1. An information protection method for a micro control unit (MCU) chip, wherein the MCU chip comprises an instruction bus, a data bus, a flash controller and a user area of a flash memory; the flash controller is used to divide the user area into a first sub-area and a second sub-area; the information protection method comprising:
   when the instruction bus accesses the user area, determining whether the instruction bus accesses the first sub-area;
   if the instruction bus accesses the first sub-area, entering a first sub-area working state; in the first sub-area working state, allowing the instruction bus to access the user area; allowing the data bus to access the first sub-area but prohibiting the data bus from accessing the second sub-area;
   when the flash controller is in the first sub-area working state, if the instruction bus accesses the second sub-area, entering a transition state; in the transition state, temporarily prohibiting the instruction bus from accessing the user area, allowing the data bus to access the first sub-area, but prohibiting the data bus from accessing the second sub-area;
   determining whether a time in the transition state reaches a preset waiting time;
   if the time in the transition state reaches the preset waiting time, entering a second sub-area working state, in the second sub-area working state, allowing the instruction bus to access the user area, prohibiting the data bus from accessing the first sub-area, but allowing the data bus to access the second sub-area.

2. The information protection method according to claim 1, wherein the information protection method further comprises:
   after resetting the MCU chip, entering an initial state; in the initial state, allowing the instruction bus to access the user area, prohibiting the data bus from accessing the first sub-area or the second sub-area.

3. The information protection method according to claim 1, wherein the MCU chip comprises a central processing unit (CPU) with a Harvard architecture; the preset waiting time is correlated with features of the CPU; if the CPU is ARM Cortex-M3, the preset waiting time is 20 CPU clock cycles.

4. The information protection method according to claim 1, wherein the MCU chip comprises an information area of the flash memory, the information area comprises option bytes; the information protection method further comprising:
   determining a reading protection state of the user area according to the option bytes;
   if in a zero-level reading protection state, allowing reading, writing and erasing on the user area;
   if in a first-level reading protection state, allowing reading, writing and erasing on the first sub-area, only when the MCU chip boots from the user area, allowing reading, writing and erasing on the second sub-area;
   if in a second-level reading protection state, allowing reading, writing and erasing on the first sub-area and second sub-area only when the MCU chip boots from the user area.

5. The information protection method according to claim 4, wherein
   in the zero-level reading protection state, allowing the option bytes to be modified;
   in the first-level reading protection state, allowing the option bytes to be modified, if the reading protection state is modified from the first-level to the zero-level by modifying the option bytes, all information in the user area is erased;
   in the second-level reading protection state, prohibiting the option bytes from being modified.

6. The information protection method according to claim 1, wherein an on-chip private peripheral is implemented on the MCU chip, a first peripheral is a private peripheral which only works normally when a first sub-area enabling signal is high, a second peripheral is a private peripheral which only works normally when a second sub-area enabling signal is high; wherein
   in the first sub-area working state, or, in the first sub-area transition state, the first sub-area enabling signal is high, in other states, the first sub-area enabling signal is low; in the second sub-area working state, or, in the second sub-area transition state, the second sub-area enabling signal is high, in other states, the second sub-area enabling signal is low.

7. The information protection method according to claim 6, wherein the private peripheral comprises a static random access memory (SRAM).

8. The information protection method according to claim 1, wherein the first sub-area is located in a first half of an address space in the user area, the second sub-area is located in a second half of the address space in the user area.

9. An information protection device for an MCU chip, wherein, the MCU chip comprises an instruction bus, a data bus, a flash controller and a user area of a flash memory; the flash controller is used to divide the user area into a first sub-area and a second sub-area; the information protection device comprising:
a memory having instructions stored thereon;
a processor configured to execute the instructions to perform operations for information protection, comprising:
when the instruction bus accesses the user area, determining whether the instruction bus accesses the first sub-area;
if the instruction bus accesses the first sub-area, entering a first sub-area working state; in the first sub-area working state, allowing the instruction bus to access the user area; allowing the data bus to access the first sub-area but prohibiting the data bus from accessing the second sub-area;
when the flash controller is in the first sub-area working state, if the instruction bus accesses the second sub-area, entering a transition state; in the transition state, temporarily prohibiting the instruction bus from accessing the user area, allowing the data bus to access the first sub-area, but prohibiting the data bus from accessing the second sub-area;
determining whether a time in the transition state reaches a preset waiting time;
if the time in the transition state reaches the preset waiting time, entering a second sub-area working state, in the second sub-area working state, allowing the instruction bus to access the user area, prohibiting the data bus from accessing the first sub-area, but allowing the data bus to access the second sub-area.

10. The information protection device according to claim 9, wherein the operations that the processor is further configured to execute the instructions to perform comprises:
after resetting the MCU chip, entering an initial state; in the initial state, allowing the instruction bus to access the user area, prohibiting the data bus from accessing the first sub-area or the second sub-area.

11. The information protection device according to claim 9, wherein, the MCU chip comprises an information area of a flash memory, the information area comprises option bytes; the operations that the processor is further configured to execute the instructions to perform comprises:
determining a reading protection state of the user area according to the option bytes;
if in a zero-level reading protection state, allowing reading, writing and erasing on the user area;
if in a first-level reading protection state, allowing reading, writing and erasing on the first sub-area, only when the MCU chip boots from the user area, allowing reading, writing and erasing on the second sub-area;
if in a second-level reading protection state, allowing reading, writing and erasing on the first sub-area and the second sub-area only when the MCU chip boots from the user area.

12. The information protection device according to claim 11, wherein
in the zero-level reading protection state, the option bytes are allowed to be modified;
in the first-level reading protection state, the option bytes are allowed to be modified, if the reading protection state is modified from the first-level reading protection state to the zero-level reading protection state by modifying the option bytes, all information in the user area is erased;
in the second-level reading protection state, the option bytes are prohibited from being modified.

13. The information protection device according to claim 9, wherein, an on-chip private peripheral is implemented on the MCU chip, a first peripheral is a private peripheral which only works normally when a first sub-area enabling signal is high, a second peripheral is a private peripheral which only works normally when a second sub-area enabling signal is high; wherein
in the first sub-area working state, or, in a first sub-area transition state, the first sub-area enabling signal is high; in other states, the first sub-area enabling signal is low;
in the second sub-area working state, or, in a second sub-area transition state, the second sub-area enabling signal is high, in other states, the second sub-area enabling signal is low.

14. A non-transitory computer readable recording medium having computer programs stored thereon for protecting information of an MCU chip, wherein, the MCU chip comprises an instruction bus, a data bus, a flash controller and a user area of a flash memory; the flash controller is used to divide the user area into a first sub-area and a second sub-area, when the computer programs are executed by one or more processors of an electronic apparatus, the electronic apparatus is caused to perform:
when the instruction bus accesses the user area, determining whether the instruction bus accesses the first sub-area;
if the instruction bus accesses the first sub-area, entering a first sub-area working state; in the first sub-area working state, allowing the instruction bus to access the user area; allowing the data bus to access the first sub-area but prohibiting the data bus from accessing the second sub-area;
when the flash controller is in the first sub-area working state, if the instruction bus accesses the second sub-area, entering a transition state; in the transition state, temporarily prohibiting the instruction bus from accessing the user area, allowing the data bus to access the first sub-area, but prohibiting the data bus from accessing the second sub-area;
determining whether the time in the transition state reaches a preset waiting time;
if the time in transition state reaches the preset waiting time, entering the second sub-area working state, in the second sub-area working state, allowing the instruction bus to access the user area, prohibiting the data bus from accessing the first sub-area, but allowing the data bus to access the second sub-area.

15. The non-transitory computer readable recording medium according to claim 14, wherein, the electronic apparatus is further caused to perform:
after resetting the MCU chip, entering an initial state; in the initial state, allowing the instruction bus to access the user area, prohibiting the data bus from accessing the first sub-area or the second sub-area.

16. The non-transitory computer readable recording medium according to claim 14, wherein, the MCU chip comprises an information area of a flash memory, the information area comprises option bytes; the electronic apparatus is further caused to perform:

determining the reading protection state of the user area according to the option bytes;

if in a zero-level reading protection state, allowing reading, writing and erasing on the user area;

if in a first-level reading protection state, allowing reading, writing and erasing on the first sub-area, only when the MCU chip boots from the user area, allowing reading, writing and erasing on the second sub-area;

if in a second-level reading protection state, allowing reading, writing and erasing on the first sub-area and the second sub-area only when the MCU chip boots from the user area.

17. The non-transitory computer readable recording medium according to claim 16, wherein, in the zero-level reading protection state, allowing the option bytes to be modified;

in the first-level reading protection state, allowing the option bytes to be modified, if the reading protection state is modified from the first-level reading protection state to zero-level reading protection state by modifying the option bytes, all information in the user area is erased;

in the second-level reading protection state, prohibiting the option bytes from being modified.

18. The non-transitory computer readable recording medium according to claim 14, wherein, an on-chip private peripheral is implemented on the MCU chip, a first peripheral is a private peripheral which only works normally when a first sub-area enabling signal is high, a second peripheral is a private peripheral which only works normally when a second sub-area enabling signal is high; wherein in the first sub-area working state, or, in the first sub-area transition state, the first sub-area enabling signal is high, in other states, the first sub-area enabling signal is low; in the second sub-area working state, or, in the second sub-area transition state, the second sub-area enabling signal is high, in other states, the second sub-area enabling signal is low.

* * * * *